(12) United States Patent
Bonner

(10) Patent No.: US 8,887,509 B2
(45) Date of Patent: Nov. 18, 2014

(54) LIQUID LEVEL MONITORING AND REPORTING SYSTEM

(75) Inventor: Brett Colin Bonner, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 342 days.

(21) Appl. No.: 13/410,588

(22) Filed: Mar. 2, 2012

(65) Prior Publication Data
US 2013/0227960 A1      Sep. 5, 2013

(51) Int. Cl.
*F02C 1/00* (2006.01)

(52) U.S. Cl.
USPC ............................................ 60/772; 60/39.08

(58) Field of Classification Search
USPC ........... 60/39.08, 801, 802, 786–788; 702/47, 702/50, 55; 184/6.11
See application file for complete search history.

(56) References Cited

U.S. PATENT DOCUMENTS

| | | | | |
|---|---|---|---|---|
| 3,882,967 A | * | 5/1975 | Gulla et al. | 184/103.1 |
| 4,563,988 A | * | 1/1986 | Weishaupt | 123/196 S |
| 5,059,954 A | * | 10/1991 | Beldham et al. | 340/614 |
| 5,381,874 A | * | 1/1995 | Hadank et al. | 184/6.4 |
| 5,567,342 A | * | 10/1996 | Inoue et al. | 508/287 |
| 6,082,322 A | * | 7/2000 | Graham et al. | 123/196 S |
| 7,904,229 B2 | | 3/2011 | Walthall et al. | |
| 2008/0093173 A1 | | 4/2008 | James et al. | |
| 2008/0250851 A1 | | 10/2008 | Keller et al. | |
| 2009/0107771 A1 | | 4/2009 | Liu et al. | |
| 2010/0175471 A1 | | 7/2010 | Dennis, Jr. et al. | |
| 2011/0010069 A1 | | 1/2011 | Payne et al. | |
| 2011/0012592 A1 | | 1/2011 | Paradise | |

OTHER PUBLICATIONS

The Canadian Office Action mailed Apr. 1, 2014 for Canadian Application No. 2,805,192.

* cited by examiner

*Primary Examiner* — Phutthiwat Wongwian
(74) *Attorney, Agent, or Firm* — Kinney & Lange, P.A.

(57) ABSTRACT

An assembly includes a reservoir, a first sensor, a second sensor, and a controller. The first and second sensors are positioned in the reservoir. The controller is connected to both the first and second sensors. The controller sends a full signal when the first sensor indicates that liquid level in the reservoir is at or above a first level. The controller sends a fill signal when the second sensor indicates that liquid level in the sump is at or below a second level. The controller sends an approximate oil level signal with a value estimated based upon elapsed operating time since the reservoir was at or above the first level.

20 Claims, 1 Drawing Sheet

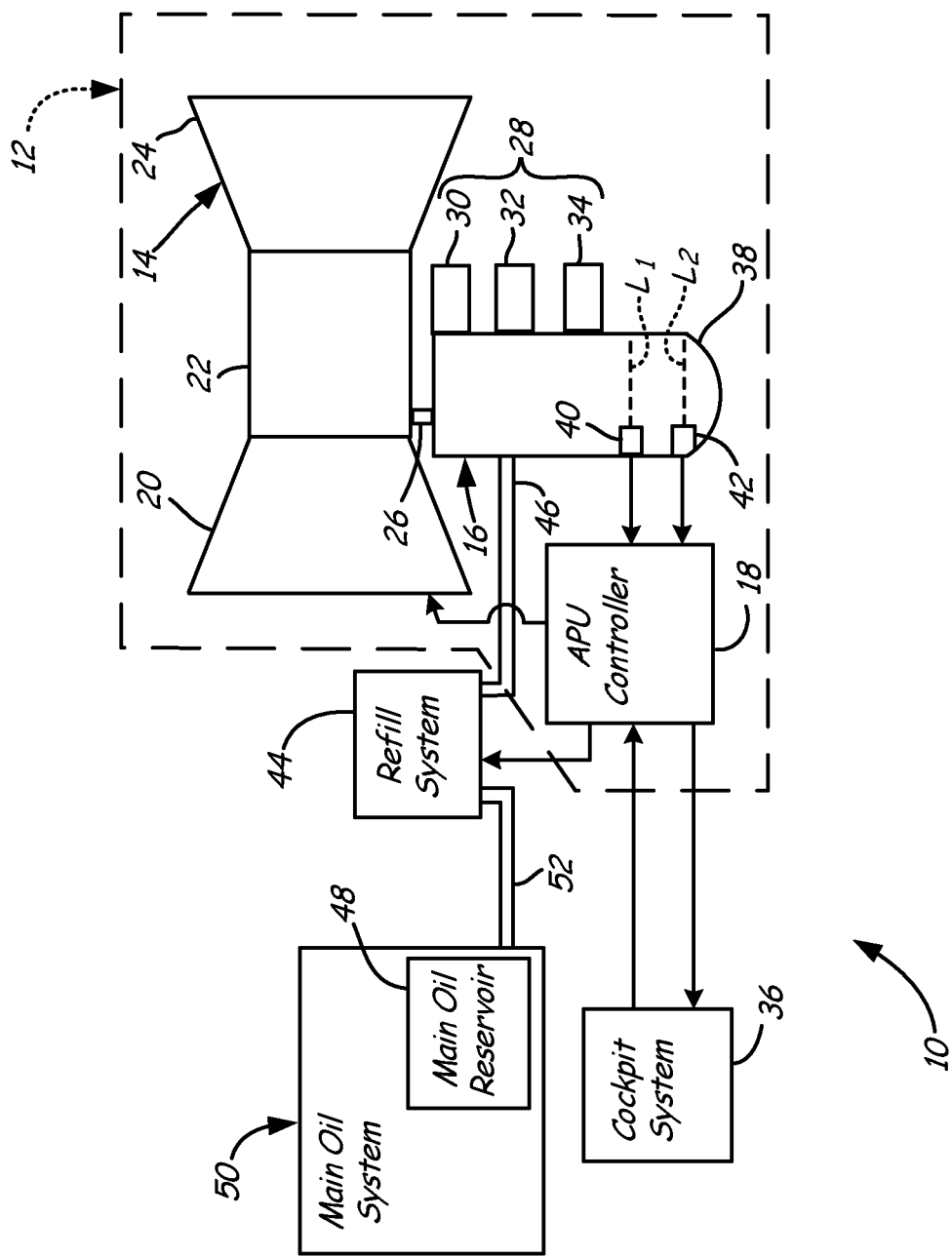

LIQUID LEVEL MONITORING AND REPORTING SYSTEM

BACKGROUND

The present invention relates to liquid level monitoring and, in particular, to monitoring oil levels in gas turbine engines. Gas turbine engines include lubrication systems that use a lubricating liquid, such as oil, to cool and lubricate components such as gears and bearings. Such systems typically use oil during operation such that the quantity of oil in the lubrication system is diminished over time. Thus, lubrication systems typically include one or more sensors to determine the quantity of lubrication in the system at any given time.

It can be difficult, however, to accurately determine the quantity of oil in a lubrication system at a given time. For example, one type of gas turbine engine is an auxiliary power unit (APU) for use on an aircraft. Varying oil temperature causes the actual volume of oil to vary, making it difficult to obtain useful sensor measurements. Sloshing of oil during aircraft movement also increases the difficulty of useful measurements. Consequently, oil levels reported to a pilot can be inaccurate, causing the pilot to believe that he needs to add oil (when he actually does not) or causing the pilot to believe that the system has sufficient oil (when it actually does not). Systems designed to account for such measurement difficulties can be complicated, expensive, and unreliable.

SUMMARY

According to the present invention, an assembly includes a reservoir, a first sensor, a second sensor, and a controller. The first and second sensors are positioned in the reservoir. The controller is connected to both the first and second sensors. The controller sends a full signal when the first sensor indicates that liquid level in the reservoir is at or above a first level. The controller sends a fill signal when the second sensor indicates that liquid level in the sump is at or below a second level. The controller sends an approximate oil level signal with a value estimated based upon elapsed operating time since the reservoir was at or above the first level.

Another embodiment of the present invention is a method for monitoring oil level. The method includes sending a first signal to an aircraft cockpit system indicating quantity of oil in a sump of an auxiliary power unit (APU) gearbox and sending a second signal to the aircraft cockpit system indicating that the sump is in need of refill. The first signal has a calculated value that is estimated based upon elapsed operating time since the sump was last filled. The second signal has a measured value that is based upon sensor data from a fill sensor obtained when the APU is not operating and when the oil is in a designated temperature range.

BRIEF DESCRIPTION OF THE DRAWINGS

FIG. 1 is a schematic view of an aircraft system including an auxiliary power unit.

DETAILED DESCRIPTION

FIG. 1 is a schematic view of aircraft system 10 including an auxiliary power unit (APU) 12. APU 12 includes gas turbine engine 14, gearbox 16, and APU controller 18. Gas turbine engine 14 includes compressor 20, combustor 22, and turbine 24, which function in a manner known in the art. In operation, aircraft system 10 can be part of an aircraft (not shown) having propulsion gas turbine engines (not shown) that are separate from gas turbine engine 14. Gas turbine engine 14 of APU 12 is included on the aircraft to provide auxiliary power; it includes no fan or propeller for propulsion.

Gearbox 16 is an accessory gearbox and is drivingly connected to gas turbine engine 14 via shaft 26. Accessories 28 are mounted to and drivingly connected to gearbox 16. In the illustrated embodiment, accessories 28 include electrical generator 30, fuel pump 32, and oil pump 34. In alternative embodiments, other accessories can be mounted to and driven by gas turbine engine 14 via gearbox 16. Electrical generator 30 can provide electrical power to various components and systems throughout aircraft system 10 and the rest of the aircraft. For example, electrical generator 30 can be connected to and power APU controller 18 and/or cockpit system 36. Fuel pump 32 is connected to and pumps fuel to gas turbine engine 14. Oil pump 34 is connected to and pumps oil to various component in APU 12, such as gears and bearings (not shown) in gas turbine engine 14, gearbox 16, and accessories 28.

Oil in gearbox 16 lubricates gears (not shown) and is collected in sump 38. Sump 38 is a reservoir for storing oil to be pumped by oil pump 34 to the various components in need of oil. Sensors 40 and 42 are positioned in sump 38 to sense a level of oil in sump 38. In the illustrated embodiment, sensors 40 and 42 are resistance temperature detector (RTD) sensors, whereby the resistance of sensors 40 and 42 varies according to whether sensors 40 and 42 are immersed in oil or in air. Sensor 40 is positioned in sump 38 at L1, which is vertically higher than a position of sensor 42, which is at L2. Sensors 40 and 42 are connected to APU controller 18. If the level of oil in sump 38 meets or exceeds L1, then sensor 40 can send a full signal to APU controller 18, indicating that sump 38 is full. If the level of oil in sump 38 is below L1, then sensor 40 can send a not-full signal to APU controller 18, indicating that sump 38 is not full. If the level of oil in sump 38 is below L2, then sensor 42 can send a fill signal to APU controller 18, indicating that sump 38 needs to be refilled. If the level of oil in sump 38 is at or above L2, then sensor 42 can send a no-fill signal to APU controller 18, indicating that sump 38 does not need to be refilled. In other embodiments, sensors 40 and 42 can be other types of sensors capable of detecting a level of oil.

Cockpit system 36 is an electronic system that includes one or more cockpit computers for use by a pilot and crew during operation of the aircraft. In the illustrated embodiment, APU controller 18 is a full authority digital engine controller (FADEC) that controls operation of gas turbine engine 14. APU controller 18 also includes an algorithm that estimates an approximate oil level in sump 38 with a value based upon elapsed operating time since sump 38 was at or above level L1. Thus, APU controller 18 can determine oil level in sump 38 according to data contemporaneously received from sensors 40 and 42 or according to the algorithm that estimates an approximate oil level. Both determinations can be useful under circumstances described below.

During operation, APU 12 uses oil such that the level of oil in sump 38 decreases from an initial full level (level L1) to a lower level (level L2) over time. In the illustrated embodiment, level L2 does not indicate that sump 38 is completely empty but rather that it is low enough that it needs to be refilled. In one embodiment, sump 38 can have a volume of about 3.0 liters, with the difference between level L1 and level L2 being about 0.3 liters. During flight, sensors 40 and 42 can be inaccurate due to sloshing of oil in sump 38, due to thermal expansion of oil caused by heat in sump 38 and the rest of APU 12, and due to other operational variances. For example, in one embodiment, the same quantity of oil can have a change in volume of about 10% in response to a change in temperature from about −40° F. (about −40° C.) to about 270° F. (about 132° C.). Additionally, during negative gravity conditions oil in sump 38 can rise toward a top of gearbox 16, rather than settling down in sump 38. Thus, APU controller 18 can be programmed to rely on sensors 40 and 42 only when sensors 40 and 42 are deemed to be reliable, such as when APU 12 is off, the oil has cooled to a designated temperature or temperature range, and the aircraft is on the ground. APU controller 18 can, essentially, ignore data from sensors 40 and 42 at other times. This allows APU controller 18 to correctly identify when sump 38 requires refilling without sending inaccurate oil level signals at other times. APU controller 18 can send a full signal when sensor 40 indicates that oil level in sump 38 is at or above level L1 and send a fill signal when sensor 42 indicates that oil level in sump 38 is at or below level L2. APU controller 18 can be programmed to send the fill signal only when sensor 42 measures and indicates that the oil level in sump 38 is at or below level L2 while APU 12 is not operating and when the oil is in a designated temperature range. APU controller 18 can suppress the fill signal at other times. Thus, sensor 42 is effectively a "fill sensor" and sensor 40 is effectively a "full sensor."

However, the pilot and flight crew can benefit from having an indication of oil level in sump 38 at other times, such as during flight or when APU 12 is operating. The use of oil by APU 12 can be relatively predictable based on elapsed operating time of APU 12. Thus, APU controller 18 can send an approximate oil level signal to cockpit system 36 with a calculated value that is estimated based on elapsed operating time since sump 38 was filled at or above L1. This time can be determined based on the last time sensor 40 provided a full signal while when APU 12 was off, the oil was cool, and the aircraft was on the ground. Using the algorithm based on elapsed operating time, APU controller 18 can send an approximate oil level signal to cockpit system 36. This approximate oil level signal is not a function of a contemporaneously sensed oil level, and can thus be reported to cockpit system 36 during flight. Cockpit system 36 can then display an estimation of oil level in sump 38 during flight based upon that approximate oil level signal. Cockpit system 36 can also display an indication that sump 38 requires additional oil upon receiving a fill signal from APU controller 18, which is not sent during flight.

Because APU controller 18 estimates an approximate oil level based on an inexact algorithm, the approximate oil level can differ from the actual oil level. Thus, APU controller 18 could determine that the approximate oil level is at or below zero (or at or below level L1), even if the actual oil level is not. This could unnecessarily alarm the pilot and flight crew. To avoid such an event, APU controller 18 can be programmed to hold the value of approximate oil level at a positive, non-zero value until sensor 42 indicates that the oil level is below level L2. Thus, cockpit system 36 would report that the oil level in sump 38 is low, but would not report that sump 38 requires refill until the appropriate time.

APU controller 18 can also periodically revise the algorithm that estimates the approximate oil level based on historical oil consumption data. For example, if APU controller 18 repeatedly estimates that the level of oil in sump 38 is below level L1 before it is actually below level L1, the algorithm can be automatically (or manually) revised to more accurately estimate the value of the approximate oil level in future estimations.

In the illustrated embodiment, aircraft system 10 includes refill system 44, which is fluidically connected to sump 38 via passage 46 for refilling sump 38 with oil. When the pilot receives an indication that sump 38 requires additional oil, the pilot can input a signal via cockpit system 36 to refill sump 38. Cockpit system 36 can then relay that signal to APU controller 18, which signals refill system 44 to refill sump 38. When the level of oil in sump 38 is refilled to level L1, cockpit system 36 can send a full signal to refill system 44 to stop refilling sump 38.

In the illustrated embodiment, refill system 44 is also connected to main oil reservoir 48 of main oil system 50 via passage 52. Main oil reservoir 48 can store oil for use on aircraft equipment other than APU 12, such as the aircraft's propulsion engines (not shown). Main oil system 50 is otherwise independent from sump 38, as sump 38 stores oil for use in APU 12 without use of oil in main reservoir 48. In an alternative embodiment, passage 52 can be omitted such that refill system 44 is dedicated to APU 12. In another alternative embodiment, refill system 44 can be omitted such that sump 38 would be refilled by other means.

Overall, aircraft system 10 can monitor liquid level on sump 38 relatively accurately and reliably. An approximate oil level can be reported in flight that is relatively accurate even when the oil has undergone thermal expansion and when the oil is sloshing in sump 38. Whether and when sump 38 actually requires refilling can be determined at a time and under conditions that facilitate accurate measurement. Sump 38 can then be refilled, or not refilled, based upon that information.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims. For example, in certain applications, sensors 40 and 42 could be positioned in a reservoir other than a sump for a gearbox. Additionally, some or all of the functions described with respect to cockpit system 36 and APU controller 18 could be performed by a separate controller. Moreover, APU 12 can include additional sensors, other components, and/or features suitable for a particular application.

The invention claimed is:

1. An assembly for an auxiliary power unit (APU) gas turbine engine, comprising:
   a gearbox having a sump;
   an electrical generator drivingly connected to the gearbox;
   a first sensor positioned in the sump;
   a second sensor positioned in the sump; and
   a controller connected to both the first and second sensors, wherein the controller outputs a full signal when the first sensor indicates that liquid level in the sump is at or above a first level, wherein the controller outputs a fill signal when the second sensor indicates that liquid level in the sump is at or below a second level, and wherein the controller outputs an approximate oil level signal with a value estimated based upon elapsed operating time since the sump was at or above the first level.

2. The assembly of claim 1, wherein the controller is a full authority digital engine control (FADEC), and further comprising:
   a cockpit computer connected to the FADEC, wherein the cockpit computer displays an estimation of oil level in the sump according to the approximate oil level signal during flight and displays an indication that the sump requires additional oil upon receiving the fill signal.

3. The assembly of claim 1, wherein the first sensor is positioned vertically higher than the second sensor.

4. The assembly of claim 1, wherein the first and second sensors are resistance temperature detector (RTD) sensors.

5. The assembly of claim 1, wherein the value of the approximate oil level signal is not a function of a contemporaneously sensed oil level.

6. The assembly of claim 1, wherein the fill signal is sent only when the second sensor indicates that liquid level in the sump is at or below the second level while the APU is not operating and when the oil is in a designated temperature range.

7. The assembly of claim 1, wherein the controller periodically revises an algorithm that estimates the value of the approximate oil level signal according to historical oil consumption data to more accurately estimate the value of the approximate oil level signal.

8. The assembly of claim 1, and further comprising:
an oil refill system fluidically connected to the sump.

9. An assembly comprising:
a reservoir;
a first sensor positioned in the reservoir;
a second sensor positioned in the reservoir;
a controller connected to both the first and second sensors, wherein the controller outputs a full signal when the first sensor indicates that liquid level in the reservoir is at or above a first level, wherein the controller outputs a fill signal when the second sensor indicates that liquid level in the sump is at or below a second level, and wherein the controller outputs an approximate oil level signal with a value estimated based upon elapsed operating time since the reservoir was at or above the first level.

10. The assembly of claim 9, wherein the reservoir is a sump of a gearbox of an auxiliary power unit (APU) and wherein the fill signal is sent only when the second sensor indicates that liquid level in the sump is at or below the second level while the APU is not operating and when the oil is in a designated temperature range.

11. The assembly of claim 9, wherein the controller periodically revises an algorithm that estimates the value of the approximate oil level signal according to historical oil consumption data to more accurately estimate the value of the approximate oil level signal.

12. The assembly of claim 9, wherein the value of the approximate oil level signal will be held at a positive, non-zero value until the second sensor indicates that liquid level is at or below the second level.

13. A method for monitoring oil level, the method comprising:
sending a first signal to an aircraft cockpit system indicating quantity of oil in a sump of an auxiliary power unit (APU) gearbox, wherein the first signal has a calculated value that is estimated based upon elapsed operating time since the sump was last filled; and
sending a second signal to the aircraft cockpit system indicating that the sump is in need of refill, wherein the second signal has a measured value that is based upon sensor data from a fill sensor obtained when the APU is not operating and when the oil is in a designated temperature range.

14. The method of claim 13, and further comprising:
delivering oil from an oil refill system to the sump to refill the sump in response to the second signal being sent to the aircraft cockpit system.

15. The method of claim 13, wherein the time at which the sump was last filled is based on sensor data from a full sensor.

16. The method of claim 13, and further comprising:
displaying an estimation of oil level in the sump according to the first signal received during flight; and
displaying an indication that the sump requires additional oil upon receiving the second signal.

17. The method of claim 13, wherein the value of the first signal is not a function of a contemporaneously sensed oil level.

18. The method of claim 13, wherein the second signal is not sent when in flight.

19. The method of claim 13, and further comprising:
periodically revising an algorithm that estimates the value of the first signal according to historical oil consumption data to more accurately estimate the value of the first signal.

20. The method of claim 13, and further comprising:
holding the value of the second signal at a positive, non-zero value until the fill sensor indicates that liquid level in the sump is at or below a level.

* * * * *